Feb. 22, 1955 W. E. HOGUE 2,702,839

AMPLIFIER CIRCUIT

Filed Nov. 29, 1945

INVENTOR
WALTERS E. HOGUE

BY M. O. Hayes

ATTORNEY

United States Patent Office 2,702,839

Patented Feb. 22, 1955

2,702,839

AMPLIFIER CIRCUIT

Walters E. Hogue, Boston, Mass., assignor, by mesne assignments, to the United States of America as represented by the Secretary of the Navy Application November 29, 1945, Serial No. 631,735

4 Claims. (Cl. 179—171)

This invention relates to amplifier circuits, and particularly to an amplifier circuit having a discontinuous or stepped characteristic.

In the prior art a stepped characteristic output has been utilized for obtaining a three tone presentation on the screen of an intensity modulated cathode ray tube in a radar system. Methods now used to obtain such a characteristic are bulky, require a plurality of devices, intricate operating adjustments, dual video output systems, mixing devices and various component modifications that, in general, are unsatisfactory.

It is the primary object of the present invention to overcome the foregoing disadvantages.

Another object of this invention is to provide a stepped characteristic in an amplifier circuit of a very stable nature.

Another object of this invention is to provide such an amplifier circuit in which the step widths can be controlled.

Another object of this invention is to provide a voltage amplifier circuit well adapted to give a three tone presentation when used to intensity modulate a cathode ray tube in a radar system.

Still another object of this invention is to provide an amplifier with a stepped characteristic with the step limits sharply defined and well adapted to produce target contrast on a radar system indicator.

Other and further objects will be apparent upon consideration of the following description together with the accompanying drawings, in which.

Figure 1:
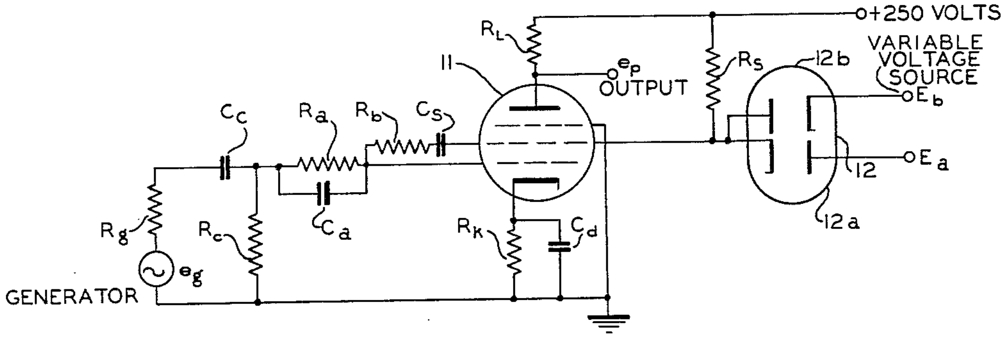
Fig. 1 shows generally, a wiring diagram of an embodiment of said invention.

Referring to Fig. 1, a negative signal is applied to the control grid of tube 11 and as this signal becomes more negative, the control grid current and hence the screen grid current decreases. An amount of inverse feedback dependent on this screen grid current is fed back to the control grid. By applying a proper potential to the screen grid through a dual section diode tube 12 the screen grid can be clamped at certain levels and thus control the amount of feedback. Therefore for a wide variance of input signals the feedback can be kept constant and a stepped output characteristic will result. This stepped output characteristic causes a black, gray, or white shade to appear on a cathode ray tube indicator, in the order of the ability of a target to reflect back energy.

Figure 4:
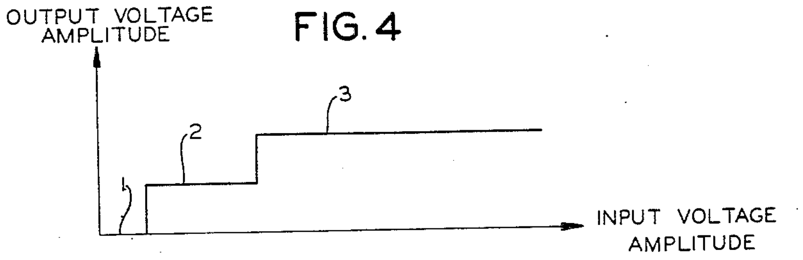
Fig. 4 shows the ideal characteristic desired for such an amplifier circuit.

In Fig. 4 is shown the ideal type output characteristic desired from such an amplifier circuit. The signals of low input strength would fall on portion 1 of the characteristic and appear as black; signals of somewhat greater strength would fall on portion 2 of the characteristic and appear as gray; while signals of a maximum value will fall on portion 3 of the characteristic and appear as white when the output of the circuit is used to intensity modulate a cathode ray tube indicator.

Such an ideal output characteristic is difficult to obtain, however, due to tube reaction to signal input and inherent operating conditions within the circuit.

Figure 3:
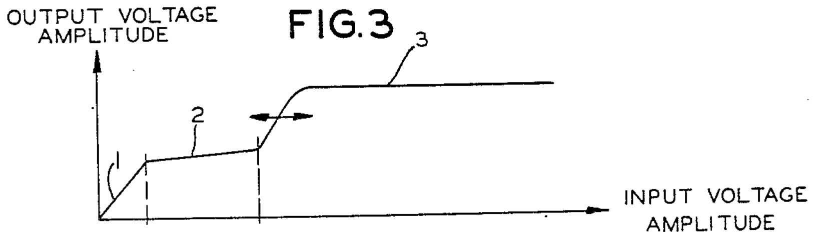
Fig. 3 shows the circuit characteristic set for a narrow step.

In Fig. 3 is shown the output characteristic as actually obtained from this invention, and this approaches the ideal characteristic of Fig. 4 far more closely than was heretofore obtainable.

Figure 2:
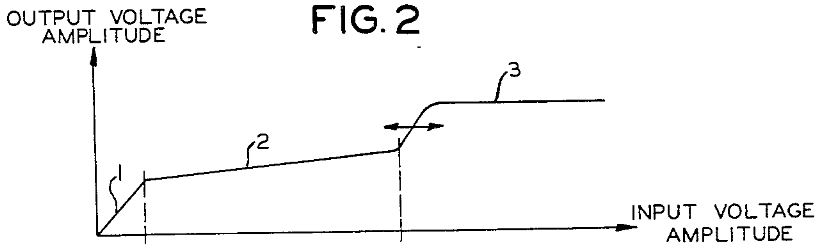
Fig. 2 shows the circuit characteristic set for a wide step.

Comparison of Fig. 2 with Fig. 3 shows one advantage of this invention in making possible adjustment of the width of the steps. This is done by varying the potential applied to the screen grid of tube 11 through the clamping diode tube 12, whereby the inverse feedback can be controlled, and the step width varied. Thus the target discrimination in the gray and white zones can be adjusted as desired.

Referring again to Fig. 1, an output voltage from a detector is fed through a coupling condenser $C_c$. The voltage developed across resistor $R_a$ is applied to the grid of tube 11, which in this case is a 6AC7 pentode type. An anode potential is applied to the plate of tube 11 through a load resistor $R_L$, and to the screen grid of tube 11 through a voltage dropping resistor $R_s$. The by-pass condenser $C_a$ acts as a high frequency compensator. A grid biasing resistor $R_c$ and a cathode biasing resistor $R_k$ with by-pass condenser $C_d$ complete the circuit for a normal voltage amplifier circuit. However inverse feedback is fed through the blocking condenser $C_s$ and a voltage developed across resistor $R_b$ and applied to the grid of tube 11. This feedback is limited by the clamping action of tube 12, a 6H6 twin diode with sections $12_a$ and $12_b$ oppositely polarized, one section having its conducting range controlled by a variable voltage applied at $E_b$, and the other section receiving a predetermined set voltage applied to $E_a$. This limits the range of voltage change at the screen grid of tube 11 to a voltage between the potentials $E_a$ and $E_b$.

It is understood that the amplifier will operate with the output from the detector in a receiving device, but that the detector has been replaced hereby a signal generating device for ease of explanation. As was already mentioned, the discontinuous characteristic of the stage is obtained by introducing inverse feedback from the screen grid to the control grid of tube 11. The amount of this feedback is made a function of screen grid current and hence of control grid voltage by means of the clamping action of diodes $12_a$ and $12_b$. It is clear that while the screen grid is clamped either by diode $12_a$ or by $12_b$ the amount of inverse feedback from screen to grid will be small and the incremental gain of the stage will be large. If neither diode conducts, however, the amount of inverse feedback will be determined only by the ratio $$\frac{R_a+R_x}{R_a+R_x+R_b}=B$$

the impedances of $C_c$ and $C_s$ being made negligibly small and the shunt impedance of the grid leak $R_c$ being large enough to ignore. B is the feedback factor. If M represents the voltage gain of the screen grid without feedback, and M′ represents the screen grid gain with feedback of an amount B present, then $$\frac{M}{M'}=1+BM$$

gives the ratio of the high gain portions to the slope of the low gain portions or "step" in the characteristic of the stage, provided the ratio between plate and screen grid currents is sensibly constant.

The operation of the circuit is best understood by considering it in a "no signal" condition, and then by describing its action when an increasingly negative signal voltage is applied by the generator.

The plate of diode setcion $12_a$ is held at a potential $E_a$, some few volts more positive than the screen would be maintained by the screen grid current through $R_s$ when no signal is applied.

The cathode of $12_b$ is held at a potential $E_b$ several volts more positive than the anode of $E_a$ so that initially, section $12_a$ conducts and section $12_b$ does not, and no feedback is present. The application of an increasingly negative voltage by the generator now causes plate and screen grid current to decrease, and the stage amplifies in the usual manner until the screen grid current has decreased below the value required to maintain the cathode $12_a$ at a potential below its plate potential. At this point section $12_a$ stops conducting, and its impedance increases from a few thousand ohms to an open circuit. A further decrease in screen grid current now results in the screen-to-grid feedback already described, with the resultant large decrease in the slope of the characteristic. This situation continues with increasingly negative input from the generator until the screen grid current has decreased sufficiently to bring the plate of section $12_b$ to the level of the cathode of $E_b$. Then section $12_b$ conducts and the resulting low impedance again clamps the screen grid, eliminating inverse feedback and allowing the incremental gain of the stage to return to its initial value. This latter condition continues until final cutoff.

Control of the D. C. voltage $E_b$ allows the extent of the step to be arbitrarily set from zero up to a value limited by its own slope and cutoff point. The ratio of the amplitudes of the two high gain regions can be controlled by adjusting the potential $E_a$.

Using a 6AC7 for tube 11 and a 6H6 twin triode for tube 12 with values for components shown in Fig. 1 as follows, $C_c$—.05 microfarad
$C_a$—10 micromicrofarads
$C_s$—.01 microfarad
$C_d$—.25 microfarad
$R_a$—22,000 ohms
$R_b$—68,000 ohms
$R_c$—300,000 ohms
$R_g$—2,000 ohms
$R_k$—100 ohms
$R_L$—5,000 ohms
$R_s$—68,000 ohms A curve similar to Fig. 3 was plotted under laboratory conditions on an oscilloscope by putting the output $e_p$ directly on a vertical plate of the oscilloscope, while a suitably attenuated portion of the horizontal sweep voltage was applied to the input of the stage. The shape of the curve was practically independent of sweep speeds from 1 microsecond per inch to 30 microseconds per inch.

Typical values for a characteristic similar to that shown in Fig. 3 are $e_{g1}$=1.5 volts
$e_{g2}$=7.0 volts
$e_{p1}$=30 volts
$e_{p2}$=60 volts
(where=signifies "is approximately equal to")

with $E_a$ set at plus 115 volts and $E_b$ variable from plus 115 volts for a step of zero width to $E_b$=plus 130 volts for a step of the width shown.

The ratio of high gain slope to "step" slope was observed to be between 7 and 8. Taking $\mu$=36 for the screen, and assuming an internal screen resistance $r_s$ of 20,000 ohms (five times $r_p$ for a 6AC7 triode-connected), the screen gain M without feedback is $$\frac{\mu(\text{resistance of } R_s \text{ and } R_a+R_b+R_g \text{ in parallel})}{r_s+(\text{resistance of } R_s \text{ and } R_a+R_b+R_g \text{ in parallel})}$$

$$\therefore M \doteq \frac{36(35K)}{20K+35K}=23 \text{ (in which } K=1000 \text{ ohms)}$$

and $$B=\frac{R_g+R_a}{R_g+R_a+R_b}=\frac{2K+22K}{2K+22K+68K}=0.26$$

giving $$\frac{M}{M'}=1+BM=7$$

as the calculated ratio of high gain slope to "step" slope of the characteristic.

By properly compressing the receiver characteristic before it is applied to the amplifier the decibel difference in terms of signal input power between the first and second limit levels can be set by adjusting $E_b$ to any value from 0 decibels to 30 decibels. In prior devices used in the art this can not be done as they cease to have two limit levels at about 15 decibels and their maximum level is not limited. It is thought, however, that contrasts in the region from 0 to 15 decibels will give more information about the target surface than contrasts above 30 decibels.

The invention is only to be limited by the appended claims.

What is claimed is:

1. An amplifier circuit comprising a tube including a screen grid and a control grid, a signal source coupled to said control grid, a source of plate potential for the anode of said tube, a dropping resistor, said source of anode potential being connected through said dropping resistor to said screen grid, means to introduce inverse feedback from said screen grid to said control grid, and oppositely polarized diode tube sections commonly coupled on one side to said screen grid, and separately coupled on the other side to two sources differing in potential, said diode sections conducting in the potential range between the two sources, in order to control said inverse feedback, said feedback being a function of screen grid current and hence of said control grid voltage.

2. An amplifier circuit comprising a tube including a screen grid and a control grid, a signal source, a resistor-condenser network coupling said signal source to said control grid, a load resistor, a source of plate potential connected to the anode of said tube through said load resistor, a dropping resistor, said source of anode potential being connected through said dropping resistor to said screen grid, means including a resistor-condenser circuit to introduce inverse feedback from said screen grid to said control grid, and oppositely polarized diode tube sections commonly coupled on one side to said screen grid, and separately coupled on the other side to two sources differing in potential, said diode sections conducting in the potential range between the two sources, in order to control said inverse feedback, said feedback being a function of screen grid current and hence of said control grid voltage.

3. An amplifier circuit comprising a tube including a screen grid and a control grid, a signal source coupled to said control grid, a source of plate potential for the anode of said tube, a dropping resistor, said source of anode potential being connected through said dropping resistor, to said screen grid, means to introduce inverse feedback from said screen grid to said control grid, and oppositely polarized diode tube sections commonly coupled on one side to said screen grid, and separately coupled on the other side to two sources differing in potential, said diode sections conducting in the potential range between the two sources, in order to control said inverse feedback, said feedback being a function of screen grid current and hence of said control grid voltage, the resulting output being stepped, and one of said sources to said diode tube being adjustable in potential in order to control the width of the step in the output.

4. An amplifier circuit comprising a tube including a screen grid and a control grid, a signal source coupled to said control grid, a load resistor, a source of plate potential connected to the anode of said tube through said load resistor, a dropping resistor, said source of anode potential being connected through said dropping resistor to said screen grid, means including a resistor-condenser circuit to introduce inverse feedback from said screen grid to said control grid, and oppositely polarized diode tube sections commonly coupled on one side to said screen grid, and separately coupled on the other side to two sources differing in potential, said diode sections conducting in the potential range between the two sources, in order to control said inverse feedback, said feedback being a function of screen grid current and hence of said control grid voltage, the resulting output being stepped, and the potential to one of said diode tube sections being adjustable in potential in order to control the width of the step in the output.

References Cited in the file of this patent

UNITED STATES PATENTS

| | | |
|---|---|---|
| 2,222,933 | Blumlein | Nov. 26, 1940 |
| 2,390,502 | Atkins | Dec. 11, 1945 |
| 2,400,919 | Crawley | May 28, 1946 |
| 2,428,363 | Elmendorf | Oct. 7, 1947 |

FOREIGN PATENTS

| | | |
|---|---|---|
| 536,616 | Great Britain | May 21, 1941 |